United States Patent
Wu

(10) Patent No.: US 9,951,521 B2
(45) Date of Patent: Apr. 24, 2018

(54) SELF-CONFINING CERAMIC ARTICLES USING ADVANCED MATERIAL REINFORCEMENTS AND METHOD OF MANUFACTURE

(71) Applicant: WAYNE STATE UNIVERSITY, Detroit, MI (US)

(72) Inventor: Hwai-Chung Wu, Ann Arbor, MI (US)

(73) Assignee: Wayne State University, Detroit, MI (US)

( * ) Notice: Subject to any disclaimer, the term of this patent is extended or adjusted under 35 U.S.C. 154(b) by 0 days.

(21) Appl. No.: 14/403,814

(22) PCT Filed: May 31, 2013

(86) PCT No.: PCT/US2013/043660
§ 371 (c)(1),
(2) Date: Nov. 25, 2014

(87) PCT Pub. No.: WO2013/181565
PCT Pub. Date: Dec. 5, 2013

(65) Prior Publication Data
US 2015/0113912 A1    Apr. 30, 2015

Related U.S. Application Data

(60) Provisional application No. 61/653,708, filed on May 31, 2012.

(51) Int. Cl.
*E04C 5/07* (2006.01)
*E04G 23/02* (2006.01)
(Continued)

(52) U.S. Cl.
CPC .............. *E04C 5/073* (2013.01); *B29C 39/10* (2013.01); *C04B 26/02* (2013.01); *C04B 28/04* (2013.01);
(Continued)

(58) Field of Classification Search
CPC ......... E04C 5/073; C04B 35/80; C04B 35/83; C04B 2235/5248; Y10T 442/134
See application file for complete search history.

(56) References Cited

U.S. PATENT DOCUMENTS 3,949,144 A * 4/1976 Duff .......................... E04C 2/26
428/413
4,706,430 A * 11/1987 Sugita ....................... E04C 5/07
428/109
(Continued)

FOREIGN PATENT DOCUMENTS

EP    1160072 A2    12/2001
EP    1840293 A2    10/2007
(Continued)

OTHER PUBLICATIONS

International Search Report dated Sep. 3, 2013 issued in PCT/US13/043660 (filed May 31, 2013), 3 pgs.

*Primary Examiner* — Gisele D Ford
(74) *Attorney, Agent, or Firm* — Brooks Kushman P.C.

(57) ABSTRACT

A self-confining structural article includes a ceramic matrix with a reinforcement member disposed within the ceramic matrix. The reinforcement member is continuous, and has a mesh with holes not exceeding 4 mm in size.

24 Claims, 12 Drawing Sheets

(51) Int. Cl.
*C04B 35/80* (2006.01)
*C04B 26/02* (2006.01)
*C04B 28/04* (2006.01)
*B29C 39/10* (2006.01)
*E04C 3/26* (2006.01)
*E04C 3/34* (2006.01)
*B29L 31/00* (2006.01)

(52) U.S. Cl.
CPC ............... *C04B 35/80* (2013.01); *E04C 3/26* (2013.01); *E04C 3/34* (2013.01); *E04G 23/0218* (2013.01); *B29L 2031/001* (2013.01); *C04B 2235/5248* (2013.01); *E04G 2023/0251* (2013.01); *Y10T 428/232* (2015.01); *Y10T 428/249922* (2015.04); *Y10T 442/107* (2015.04); *Y10T 442/134* (2015.04)

(56) References Cited

U.S. PATENT DOCUMENTS

| | | | |
|---|---|---|---|
| 4,909,002 A | | 3/1990 | Clifton et al. |
| 4,910,076 A | * | 3/1990 | Ando ............... C04B 20/12 442/20 |
| 6,358,603 B1 | * | 3/2002 | Bache ............... B32B 5/16 428/323 |
| 6,503,625 B1 | * | 1/2003 | Rieder ............... B29C 70/10 428/399 |
| 7,523,924 B2 | * | 4/2009 | Melancon ............... E04C 5/02 267/166 |
| 2003/0154683 A1 | * | 8/2003 | Bache ............... E04C 3/22 52/586.1 |
| 2004/0031223 A1 | * | 2/2004 | Durning ............... B32B 13/04 52/309.17 |
| 2006/0236649 A1 | * | 10/2006 | Christensen ............... E04C 3/36 52/834 |
| 2010/0281815 A1 | * | 11/2010 | Martin Hernandez . E04F 15/22 52/687 |

FOREIGN PATENT DOCUMENTS

| | | |
|---|---|---|
| JP | 11-165311 A | 6/1999 |
| WO | 2006-020261 A2 | 2/2006 |

* cited by examiner

SELF-CONFINING CERAMIC ARTICLES USING ADVANCED MATERIAL REINFORCEMENTS AND METHOD OF MANUFACTURE

CROSS-REFERENCE TO RELATED APPLICATIONS

This application is the U.S. National Phase of PCT Appln. No. PCT/US2013/043660 filed May 31, 2013, which claims the benefit of U.S. provisional application Ser. No. 61/653,708 filed May 31, 2012, the disclosures of which are incorporated in their entirety by reference herein.

BACKGROUND OF THE INVENTION

1. Field of the Invention

Embodiments herein disclose self-confining ceramic articles using advanced material reinforcements and methods of manufacture.

2. Background Art

Structural members include beams, slabs and columns reinforced with steel bars. Steel is prone to corrosion, which leads frequently to cracking of the structural member. To minimize corrosion of steel reinforcement in a structural member, for example, a steel-reinforced concrete member, the member needs a covering layer of concrete of at least 30 to 50 mm thickness, increasing the cost and weight of the structural member. In addition, steel makes the reinforcement very heavy, as well as requiring substantial amounts of labor to install the reinforcement in a preform.

When structural members have a ceramic matrix, the corrosion of the steel leads to unpredictable catastrophic failure of the ceramic matrix under compressive load. Substitution of polyethylene fibers, carbon fibers, glass fiber reinforced polymer tubes or fiberglass-reinforced plastic rods (rebar) for steel reinforcements do not remedy this failure because they are not malleable. In addition, the presence of plastic rebar reduces the fire resistance of the structural components.

SUMMARY OF THE INVENTION

The present invention solves one or more problems of the prior art by providing in at least one embodiment a self-confining structural article, in particular a fabric mesh reinforced structural article. The self-confining structural article includes a ceramic matrix having an outer surface. At least one continuous reinforcement member is included in the ceramic matrix and is disposed within and adjacent to the outer surface of the ceramic matrix. The reinforcement member has a fabric mesh of woven, knit, braided or knotted material of open texture with evenly spaced holes that are less than or equal to 4 mm in dimension.

In another embodiment, a self-confining structural article with a retainer bracket is provided. The self-confining structural article includes a ceramic matrix having an outer surface. At least one continuous reinforcement member is included in the ceramic matrix and is disposed within and adjacent to the outer surface of the ceramic matrix. The reinforcement member has a fabric mesh with holes that are less than or equal to 4 mm in dimension. A retainer bracket is placed around the reinforcement member for centering. Portions of the bracket extend to the outer surface of the ceramic matrix.

In another embodiment, a method of forming a self-confining structural article is also provided. First, a shaped reinforcement member is placed inside a mold for the ceramic matrix. The ceramic material is then poured into the mold over the reinforcement member. The ceramic material is partially cured and then the mold is opened, if desired, to remove the shaped reinforcement member. Final curing then takes place.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "ter-polymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Figure 1:
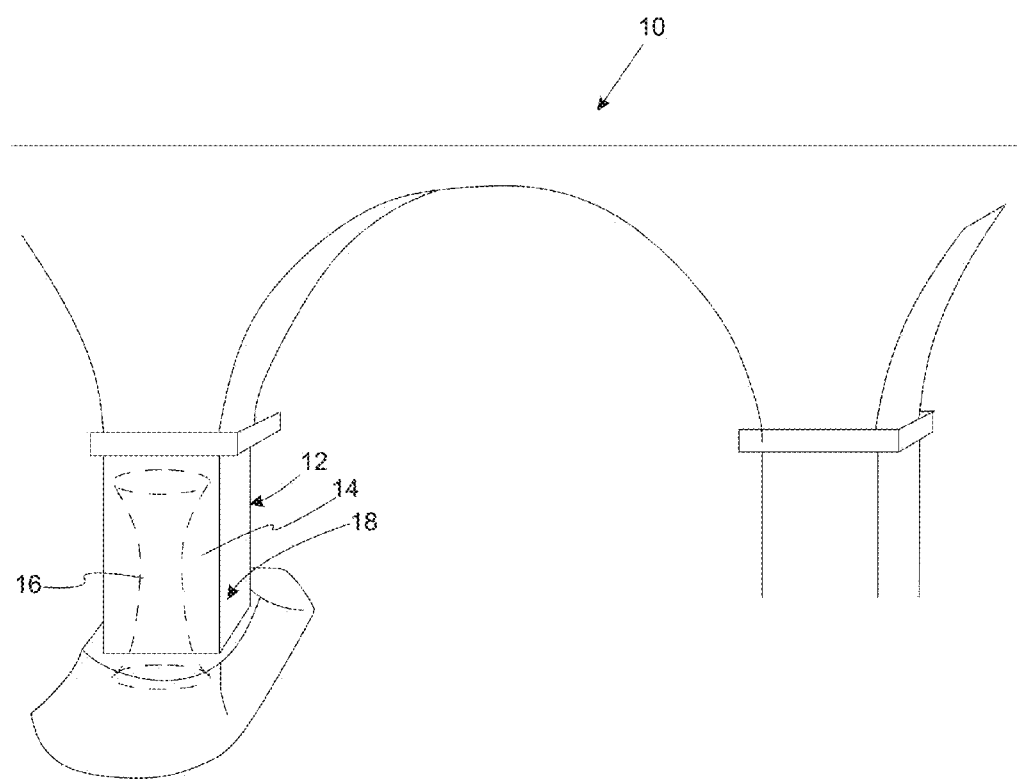
FIG. 1 schematically illustrates an isometric view of a bridge having a self-confining structural column member according to at least one embodiment.

FIG. 1 schematically illustrates an isometric view of a bridge 10 having a structural article, such as a self-confining structural column member 12 having an outer surface 18, according to at least one embodiment. Self-confining structural column member 12 includes a ceramic matrix, such as a concrete matrix 14; and a reinforcement 16 disposed within concrete matrix 14. In at least one variation, reinforcement 16 is a tube-shaped reinforcement. In another variation, reinforcement 16 is a plate-shaped reinforcement. In yet another refinement, reinforcement 16 is a curved plate-shaped reinforcement.

In at least one variation, self-confining structural column member 12 is a long column or beam member. In a refinement of this variation, column or beam member 12 is from 5 feet to 30 feet. In another variation, self-confining structure column member 12 is a short column member. In a refinement of this variation, self-confining structure column member 12 is less than 5 feet. In a variation, self-confining structural column or beam member 12 is a transitional structural member converting a longer unreinforced column or beam into a shorter unreinforced column or beam which includes an adjacent self-confining structural column or beam member 12 so that the combination functions as though the combined member were a long, self-confined structural column or beam. For example, the height span of member 10 in FIG. 1 is shortened by the use of self-confining structural member 12 and the shortened length makes the member 10 stronger.

Figure 2:
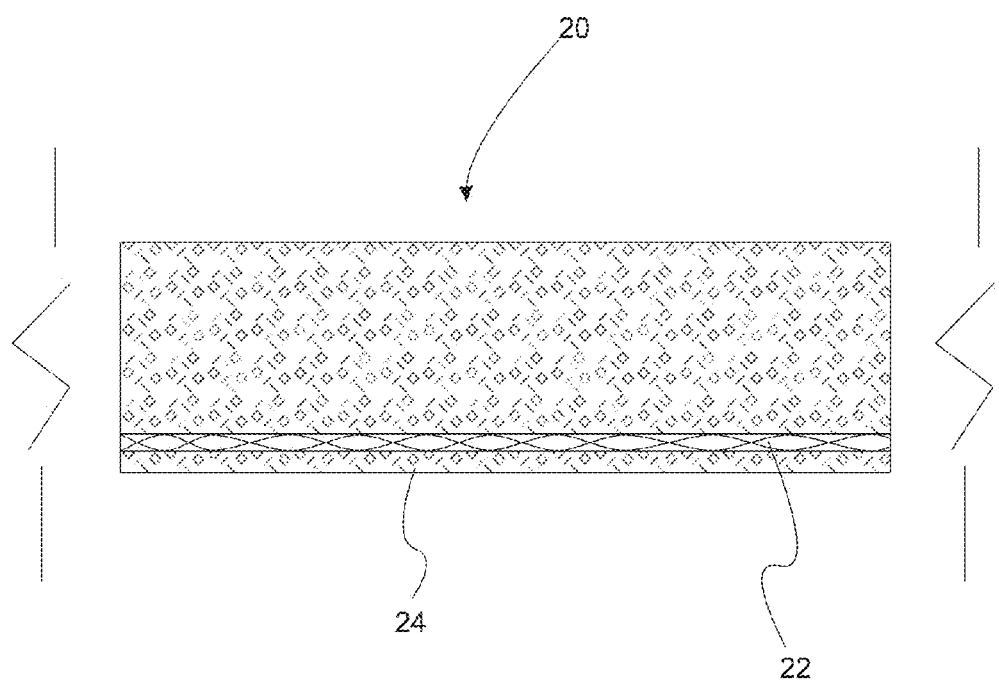
FIG. 2 schematically illustrates a fragmentary, cross-sectional view of a self-confining concrete slab according to at another embodiment.

FIG. 2 schematically illustrates an fragmentary isometric view of a self-confining concrete slab or beam 20, such as a highway concrete section, having a reinforcement plate 22 according to at least one embodiment. Self-confining concrete slab 20 has a surface 24 that under the pressure of the load, is strained in tension as distinct from a compressive strain. Reinforcement plate 22 is disposed near the tensile surface 24 about which concrete matrix 14 is poured. Depending upon the load requirements, the reinforcement plate 22 forms a side wall, such as the curved plate or a wavy (i.e. crimped) flat plate or a tube, that in certain embodiments can provide confinement to the self-confining concrete slab 20.

Figure 3:
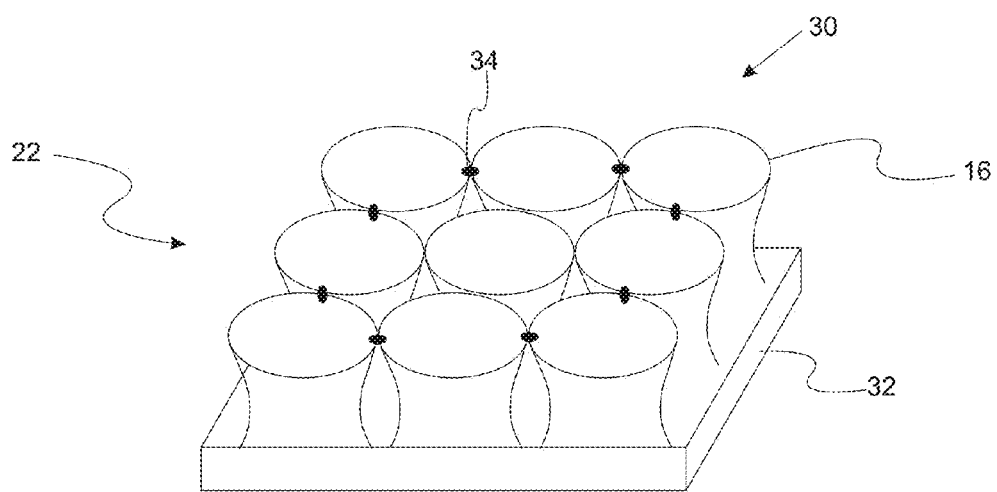
FIG. 3 schematically illustrates an isometric view of a preform according to at least one embodiment.

FIG. 3 schematically illustrates a isometric view of a preform 30 suitable for off-site, assembly line-type manufacturing to reduce the labor content of installing reinforcements for making concrete slabs or beams. Preform 30 includes a frame 32 connected to reinforcements 16 adjacent to the periphery of array 22. At least two of reinforcements 16 in array 22 are connected by a fastener 34. While fastener 34 is illustrated as connecting adjacent reinforcement 16 tops, it should be understood that fastener 34 may connect together any suitable portions of reinforcement 16.

Figure 4:
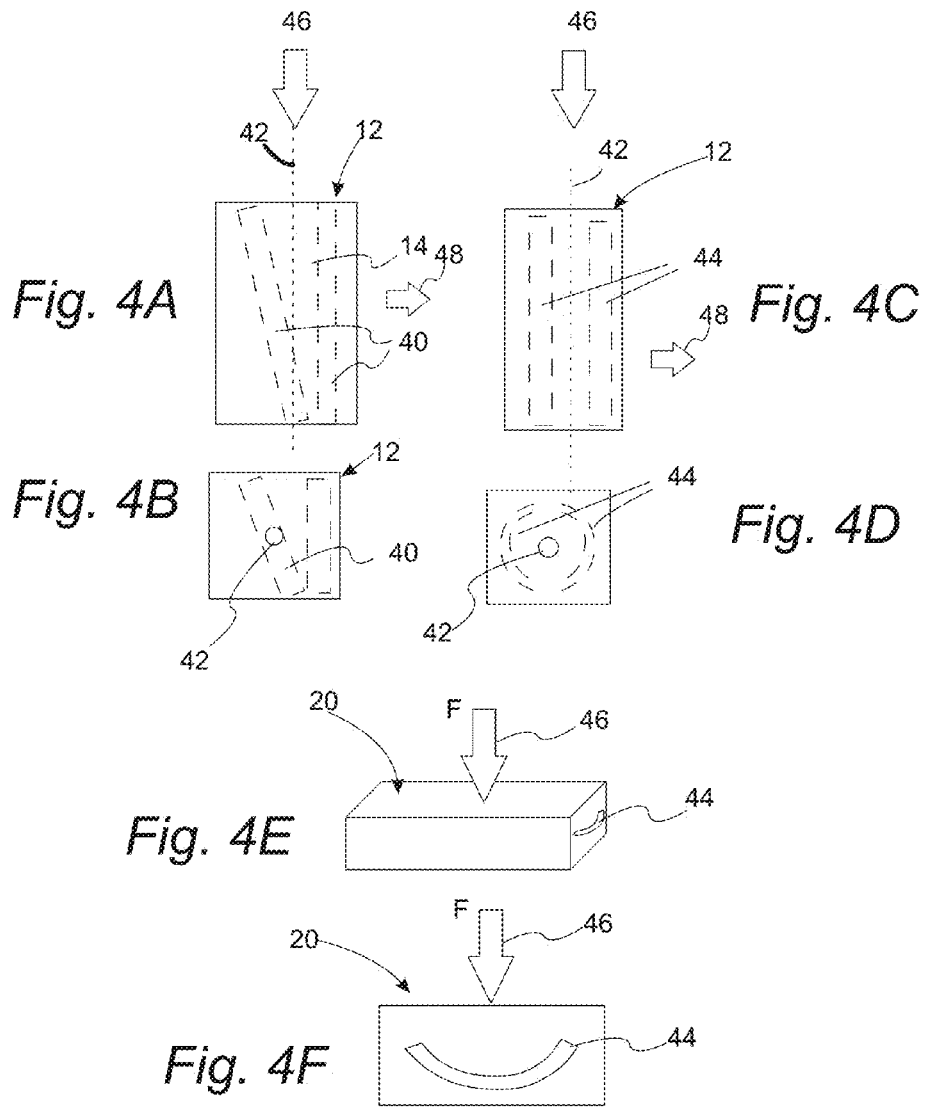
FIGS. 4A-F schematically illustrate side and end views of columns having reinforcements according to at least one embodiment.

FIGS. 4A-F schematically illustrates side and end views of columns having reinforcements according to at least one variation. FIGS. 4A and 4B schematically illustrate a side view and a top view of self-confining structural column member 12 with concrete matrix 14 having a plate reinforcement 40 disposed at an angle to and offset relative to column member 12 longitudinal axis 42 and force vector 48 which generates a transverse force vector 46. FIGS. 4C and 4D schematically illustrate a side view and a top view of self-confining structural column member 12, respectively, having a curved plate reinforcement 44 disposed parallel to column member 12 longitudinal axis 42 and force vector 48 which generates a transverse force vector 46. FIGS. 4E and 4F schematically illustrate a side view and end view of self-confining concrete beam 20, respectively, having a curved plate reinforcement 44 with the surface which is curved inward, i.e. the concave surface, facing the load force 46. The curved plate reinforcement in another variation is a tube.

Referring to FIGS. 1-4, plate reinforcement 40, curved plate reinforcement 44, reinforcement 16 and reinforcement plate 22 and all other reinforcement shapes herein are a reinforcement structure forming before, or during loading a concave structure in the direction of loading. In a variation, reinforcement 16, reinforcement 22, plate reinforcement 40, and curved plate reinforcement 44, and all other reinforcement shapes herein are a reinforcement structure shape that, during loading, generates a force vector 48 transverse to the force vector 46 in the direction of loading, shown in FIG. 4. In a variation, reinforcement 16, reinforcement plate 22, plate reinforcement 40, and curved plate reinforcement 44, and all other reinforcement shapes herein are a reinforcement structure shape that, include an interlocked reinforcement pattern under loading transferring force in multiple axes. Non-limiting examples of multiple axes force transference are found in biaxial, triaxial, and quadraxial reinforcement fabrics. These multiple axes fabrics are made up of two, three or four or more layers of parallel fibers, biaxial, triaxial and quadraxial fabrics respectively. The parallel fibers, fiber bundles, or strands are laid in differing orientations and stitched together. The diameter of the fibers is from 0.5 mm to 3 mm. The long dimension of the holes in the mesh are less than or equal to 4 mm and in a variation are 1 mm to 4 mm, and in another variation are 1 mm to 3 mm. In a refinement, the reinforcement 16, reinforcement plate 22, plate reinforcement 40, and curved plate reinforcement 44, and all other reinforcement shapes herein are a three-dimensional, concavo-convex shaped polygon, where the shape includes a side that is concave and a side which is convex, or a three-dimensional, plano-convex shaped polygon, where the shape includes a flat, planer side and a convex side, disposed within the structural article about an axis of a compressive load so as to confine portions of the structural article (i.e. the self-confining the ceramic matrix) within the reinforcement structure periphery.

Figure 5:
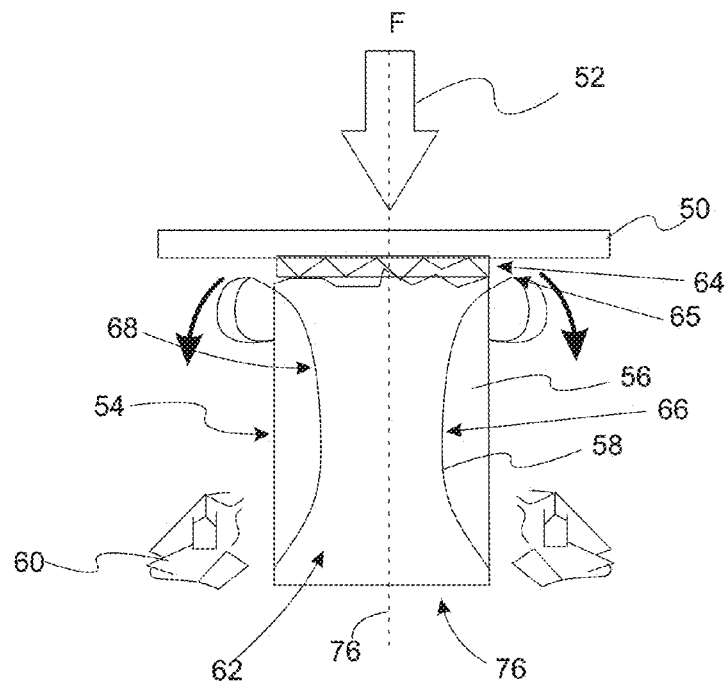
FIG. 5 schematically illustrates a cross-sectional view of a failure mode of a structural column member according to at least one embodiment.

FIG. 5 schematically illustrates a cross-sectional view of a failure mode of a structural column member according to at least one embodiment. A plate 50 applies a downward force 52 on to a long column 54 comprising a concrete matrix 56 having a core 62 and a cover 64 encapsulating a biconical reinforcement 58. In a refinement, the biconical shape 58 is continuously and smoothly cambered inward from the ends 65 toward the center 66. As plate 50 applies the downward force 52, a structural column member fails in a noncatastrophic failure mode, wherein concrete matrix 56 incrementally crumbles adjacent to plate 50 spilling relatively small chunks of concrete 60 while the biconical reinforcement 58 rolls upon itself. The failure is categorized as a progressive failure mode, see FIG. 5. What is surprisingly not observed is more classical catastrophic failure of the ceramic matrix, i.e. concrete matrix 56.

Still referring to FIG. 5, biconical reinforcement 58 may be segmented along its longitudinal axis 76 leaving one of more gaps 68 in the self-confining reinforcement shape. The size of the gaps as described by the longest dimension, range from zero to 3 inches. It is understood that the gaps may be configured to intentionally direct a catastrophic failure of the ceramic matrix in an advantageous predetermined direction.

Figure 6A:
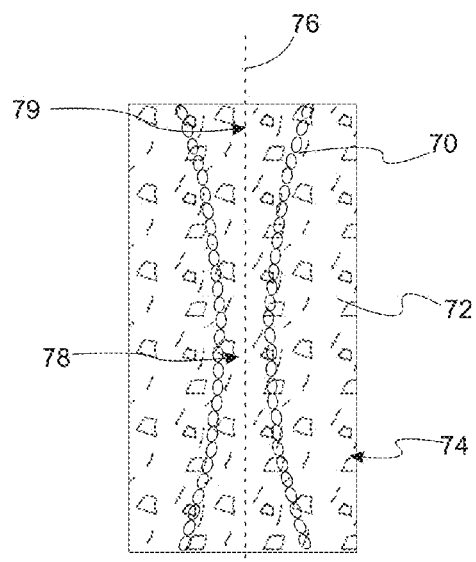
FIG. 6A-E schematically illustrates a cross-sectional view of a column having a reinforcement according to at least one embodiment.
Figure 6B:
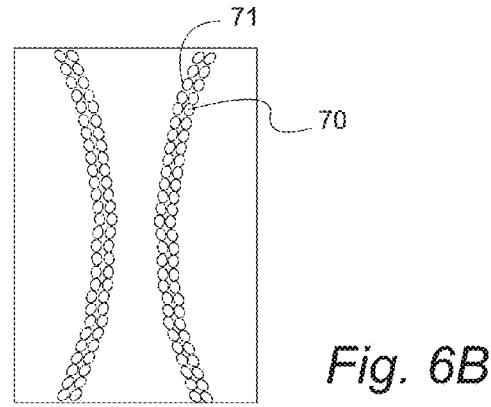
Figure 6C:
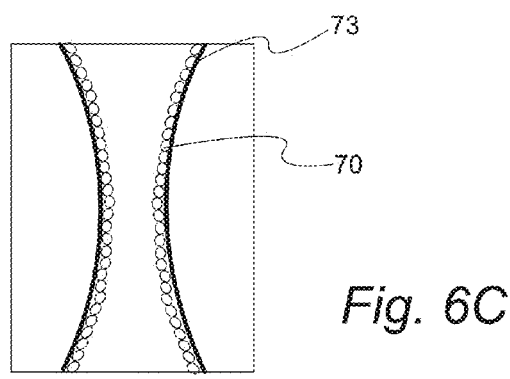
Figure 6D:
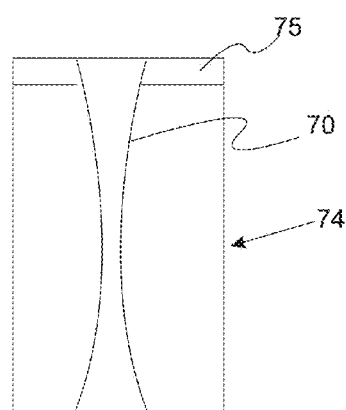
Figure 6E:
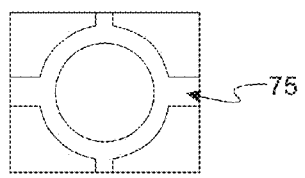

FIG. 6A schematically illustrates a cross sectional view of a biconical, braided reinforcement 70 encapsulated in a magnesium concrete matrix 72 to form a column 74 having a longitudinal axis 76 about which biconical, braided reinforcement 70 is substantially concentrically configured. Biconical reinforcement has a center cross sectional area 78 and an end cross sectional area 79. The ratio of the center cross sectional area 78 to the end cross sectional area 79 is from 0.1:1 to 1:1. In a further refinement, the ratio of the center cross sectional area 78 to the end cross sectional area 79 is from 0.2:1 to 0.8:1. In a still further embodiment the ratio of the center cross sectional area 78 to the end cross sectional area 79 is from 0.3:1 to 0.75:1. FIG. 6B schematically illustrates a side view of reinforcement member having concentric shapes, 70 and 71. FIG. 6C schematically illustrates a side view of reinforcement member 70 having a coating 73. FIGS. 6D-E schematically illustrate a side view and end view, respectively of a column 74 having a reinforcement member 70 and a retainer bracket 75. The retainer bracket 75 centers the reinforcement member 70 within the column 74.

Figure 7:
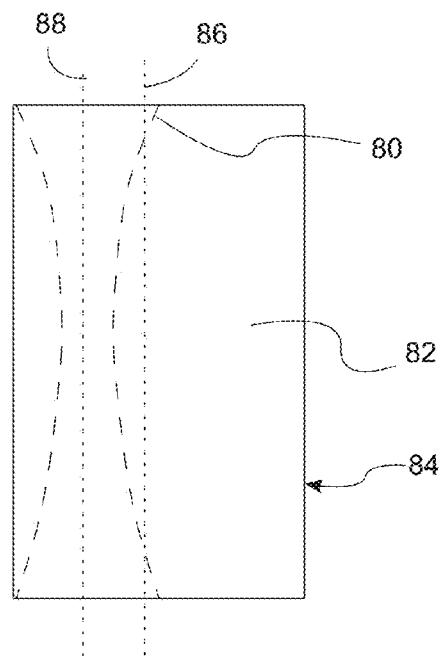
FIG. 7 schematically illustrates a side view of a column having a reinforcement according to at least one other embodiment.

FIG. 7 schematically illustrates a side view of a biconical reinforcement 80 having a longitudinal axis 88 and is encapsulated in a magnesium cement matrix 82, forming column 84. Column 84 has a longitudinal axis 86. Longitudinal axis 88 of biconical reinforcement 80 is offset from longitudinal axis 86 of column 84.

Still referring to FIG. 7, column 84 is an example of a column, which when loaded, exhibits eccentric forces that are not equivalent in all radial directions and are offset from the center In addition, placement of biconical reinforcement 80 may counter an eccentric load. To properly place the biconical reinforcement 80 along a longitudinal axis 88 that is offset from longitudinal axis 86 so as to provide a counter to the eccentric load, the secant formula is used and replicated below.

$$\ominus = P \Big/ A\left(1 + ec/r^2 \Sec\frac{\pi}{2}\sqrt{\frac{P}{Pcr}}\right)$$

Where $\ominus$ is the maximum stress (Kilopound per square inch, kip per square inch, Ksi)
P=load force (Kilopound per square inch, kip per square inch, Ksi)
Pcr=critical load for matrix failure (Kilopound per square inch, kip per square inch, Ksi)
A=cross sectional area of the column (in$^2$)
e=distance from the column center to the eccentric load (in)
c=the largest distance from the neutral axis (in)
r=radius of column (in)

It is understood that while a biconical reinforcement is illustrated, other suitable two- and three-dimensional shapes may be used without exceeding the scope or spirit of the embodiments. Examples of 2- and 3-dimensional shapes include, but are not limited to, a bipyramidal shape, a frustoconical shape, a toroidal shape, a helical shape, an annular shape, and an ellipsoidal shape. It is also understood that the reinforcements may be configured as a hybrid shape having one shape intersecting or proximate to a second shape and that the longitudinal axes of the reinforcement components have an angular relationship greater than 0 degrees.

Figure 8:
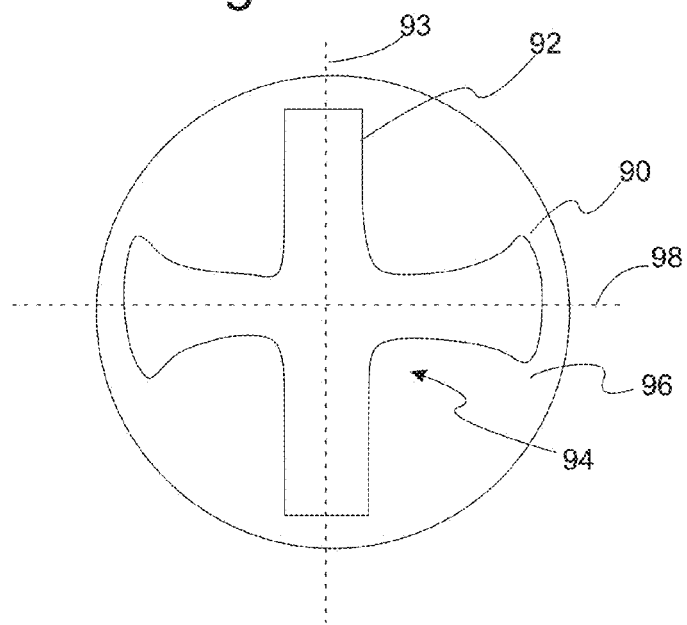
FIG. 8 schematically illustrates an end view of a column having another shape of a reinforcement according to at least one embodiment.

FIG. 8 schematically illustrates an end view of a non-limiting example having a biconical reinforcement 90 with longitudinal axis 98 intersecting a biconical reinforcement 92 with longitudinal axis 93 forming a hybrid woven reinforcement 94 that acts as a interlocking reinforcement encapsulated in a polymer concrete matrix 96.

Figure 9:
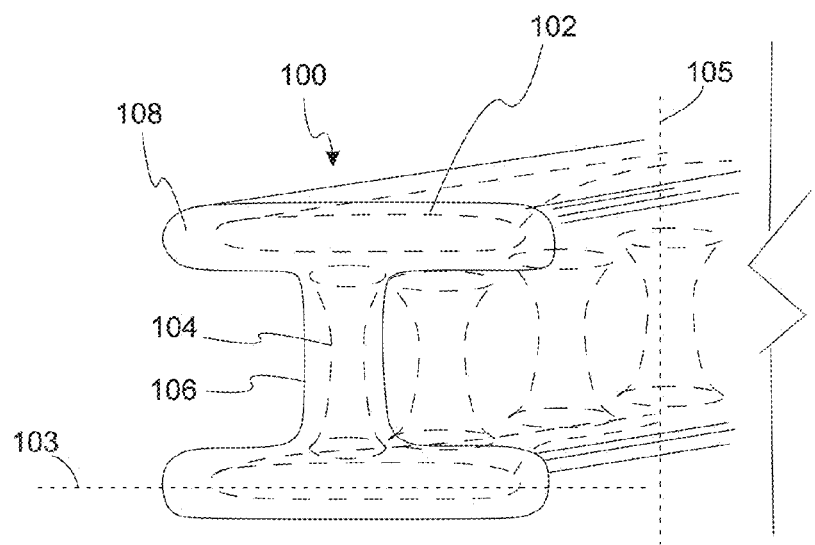
FIG. 9 schematically illustrates a fragmentary isometric view of a self-confining I-beam according to at least one variation.

FIG. 9 schematically illustrates an isometric view of another example of a reinforcement configuration where an I-beam 100 has an ellipsoidal reinforcement 102 positioned transversely to a biconical reinforcement 104, and in the direction of longitudinal axis 103, with the biconical reinforcement 104 being disposed in the web 106 and in the direction of longitudinal axis 105 of the I-beam 100 and ellipsoidal reinforcement 102 being positioned in the I-beam flange 108.

In at least one embodiment, reinforcement such as exemplary reinforcement 16, comprises a non-corroding reinforcement which does not need any cathodic protection or protective coatings to prevent corrosion. It is understood that coatings may be applied to reinforcement for other purposes, such as a coupling agent coating, a sizing coating, a lubricant coating, an alkaline-resistant latex coating and/or an antistatic coating without exceeding the scope or spirit of the embodiments. Use of the non-corroding reinforcement makes the structural article formed from such a reinforcement much less expensive because the cost of applying a corrosion protection coating and special electrical connections for cathodic protection are avoided while the reliability and life of the structural articles are extended relative to conventional structural articles having corrodible reinforcements. Further, maintenance expenses are reduced significantly in terms of maintaining the cathodic protection as well as repairing segments of the structural article due to corrosion-derived failures.

In at least one embodiment, the non-corroding reinforcement comprises an E-glass fiberglass, an S-glass fiberglass, an A-glass fiberglass, a corrosion-resistant fiberglass, a boron-free fiberglass, a polyvinyl alcohol (PVA) fiber, a basalt fiber, a carbon fiber, an aramid fiber, a polyolefin fiber, an oriented fiber, a synthetic fiber and/or a natural fiber and hybrids of these fibers.

In at least one embodiment, reinforcement comprises a fabric having a layout of a braided reinforcement including a braided knit fabric. In a variation, reinforcement comprises a layout of a nonwoven reinforcement. In yet another variation, reinforcement comprises a layout of a woven reinforcement. In a refinement, a layout of reinforcement comprises a knitted reinforcement. In yet another refinement, reinforcement comprises a layout of a stitched reinforcement, including stitched materials combining one or more of the above reinforcement layouts. The use of braided fabric, especially of a braided knit fabric formed as a tube, makes forming a biconical tube relatively simple by applying tension to the ends of the tube. A reinforcement net, such as the biconical tube, is shown to be useful in preventing catastrophic failure of the ceramic matrix in the column when the tube's longitudinal axis is essentially parallel to the longitudinal axis of the column. The surprising result is that the column incrementally crumbles under compressive force, not failing catastrophically, while the reinforcement bears the compressive force and rolls up or deflects as the column incrementally crumbles. The failure mode of the column is a progressive failure mode instead of a catastrophic failure mode.

In at least one embodiment, the reinforcement is surrounded by frame 32. Frame 32 may be comprised of metal in at least one embodiment, such as an aluminum lineal or a plate reinforcement. Preferably, frame 32 is a non-corroding material, such as a pultruded plastic lineal, a thermoplastic profile, or a thermoset profile. Frame 32 is useful in that it forms a support of preform 30. Preform 30, in at least one embodiment, can be formed in a controlled manufacturing environment, such as a manufacturing assembly line, where reduced variability and improved quality controls can be implemented relative to a field installation. Having a preformed reinforcement can reduce labor expense at field job sites because only one or two people can move the preform and place it accurately in the desired location. Preforms, such as frame 32, in certain embodiments are only 25% of the weight of their steel analogs. This relative lightness of frame 32, having advantageous reductions in massiveness or mechanical properties, needs to be designed only to support the less weight of preform 30. A further advantage preform 30 is that inspection by registered inspectors can occur at the manufacturing environment or in bulk at the job site, further reducing the indirect labor costs and third-party inspector costs. The result, in certain embodiments, can speed up construction projects, such as laying a reinforced highway segment or a reinforced bridge deck.

Figure 10:
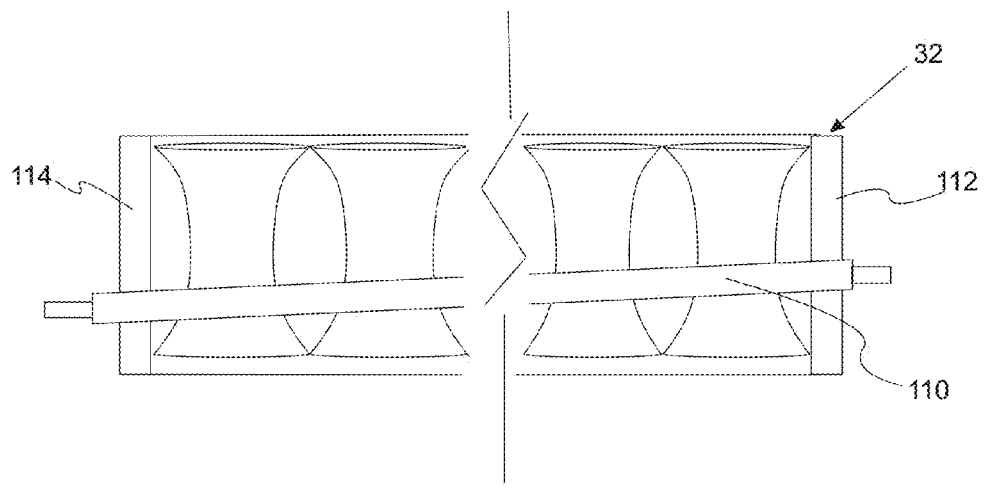
FIG. 10 schematically illustrates a fragmentary cross-sectional view of a prestressed, self-confining structural member according to at least one variation.

FIG. 10 schematically illustrates a fragmentary cross-sectional view of a frame 32 with an internal prestressing tendon 110 disposed between the peripheral sides 112 and 114 which are opposed and spaced apart. In at least one embodiment, the prestressing tendon is a pretensioning tendon. It is understood that an internal prestressing tendon is exemplary of a prestressing member. Non-limiting examples of prestressing members include, but are not limited to, a prestressing wire, a prestressing strand, a prestressing cable, a prestressing bar, a bonded prestressing tendon, a fiberglass-reinforced plastic tendon, an aramid or carbon fiber tendon and/or an un-bonded pre-stressing tendon. In at least one embodiment, prestressing the structural article, such as a slab or beam or the self-confining structural column member 12 of FIG. 1, results in a higher moment of capacity, or bending strength, and a higher moment of inertia, i.e. greater stiffness, and less deformation because the full section is used relative to the equivalently reinforced self-confining structural column member 12. In a variation, the prestressed self-confining structural column member has an increase in shear capacity relative to the equivalently reinforced self-confining structural column member. In another variation, the prestressed, self-confining structural column member has an increase in dynamic loading relative to the equivalently reinforced self-confining structural column member. In yet another variation, the prestressed, self-confining structural column member has an increase in fatigue loading relative to the equivalently reinforced self-confining structural column member.

In at least one embodiment, the prestressed, self-confining structural article has an increase in span-to-depth ratio, when in a slab, or beam, relative to the equivalently reinforced structural article. The span is defined here as the longest dimension of the slab or beam and the depth is the distance across the long section. In at least one embodiment, the span-to-depth ratio of a prestressed, self-confining structural article slab increased from 22.5:1 to 30:1 which is 25% greater than the equivalently reinforced structural article.

In at least one embodiment, the prestressed self-confining structural member is a T-section or a double T-section where the prestressing member is located adjacent to a surface in tension of the T. In a variation, the prestressed, self-confining structural member is a hollow core section, where the prestressing member is located proximate to a surface in tension. In a refinement, the prestressed self-confining structural member is a pile, where the prestressing member is disposed in an annular ring along the pile longitudinal axis and/or is disposed in a circle concentric with the annular ring for self-confinement in a hoop. In another refinement, the prestressed, self-confining structural member is an L-section, an inverted T-section, and/or an I-beam, where the prestressed member is disposed proximate to the surface in tension. In yet another refinement, the prestressed, self-confining structural member includes an external prestressing member. In another embodiment, there is a plurality of prestressed, self-confining structural members forming a biaxial or a multiaxial prestressing member arrangement cooperating with the frame.

In at least one embodiment, the matrix about the reinforcement includes the ceramic matrix. Non-limiting examples of the ceramic matrix include, but are not limited to, a Portland cement matrix, a Portland cement concrete, a magnesium cement, a magnesium concrete, a polymer cement, a polymer concrete, and a high strength concrete. In a variation, the ceramic matrix includes a non-crystalline ceramic, such as a glass. In another variation, the ceramic matrix includes a crystalline ceramic composition, such as a carbon composition; a silicon composition, such as silicon carbide and/or silicon nitride; a tungsten carbide composition and a clay.

Structural articles using reinforcement 16 (FIG. 1) in a ceramic matrix, in at least one variation, include a ceramic ball replacing a steel ball bearing; a ceramic part, such as a blade, for a gas turbine engine. In another variation, the structural article is a transition adapter situated between two other structural members.

Figure 11:
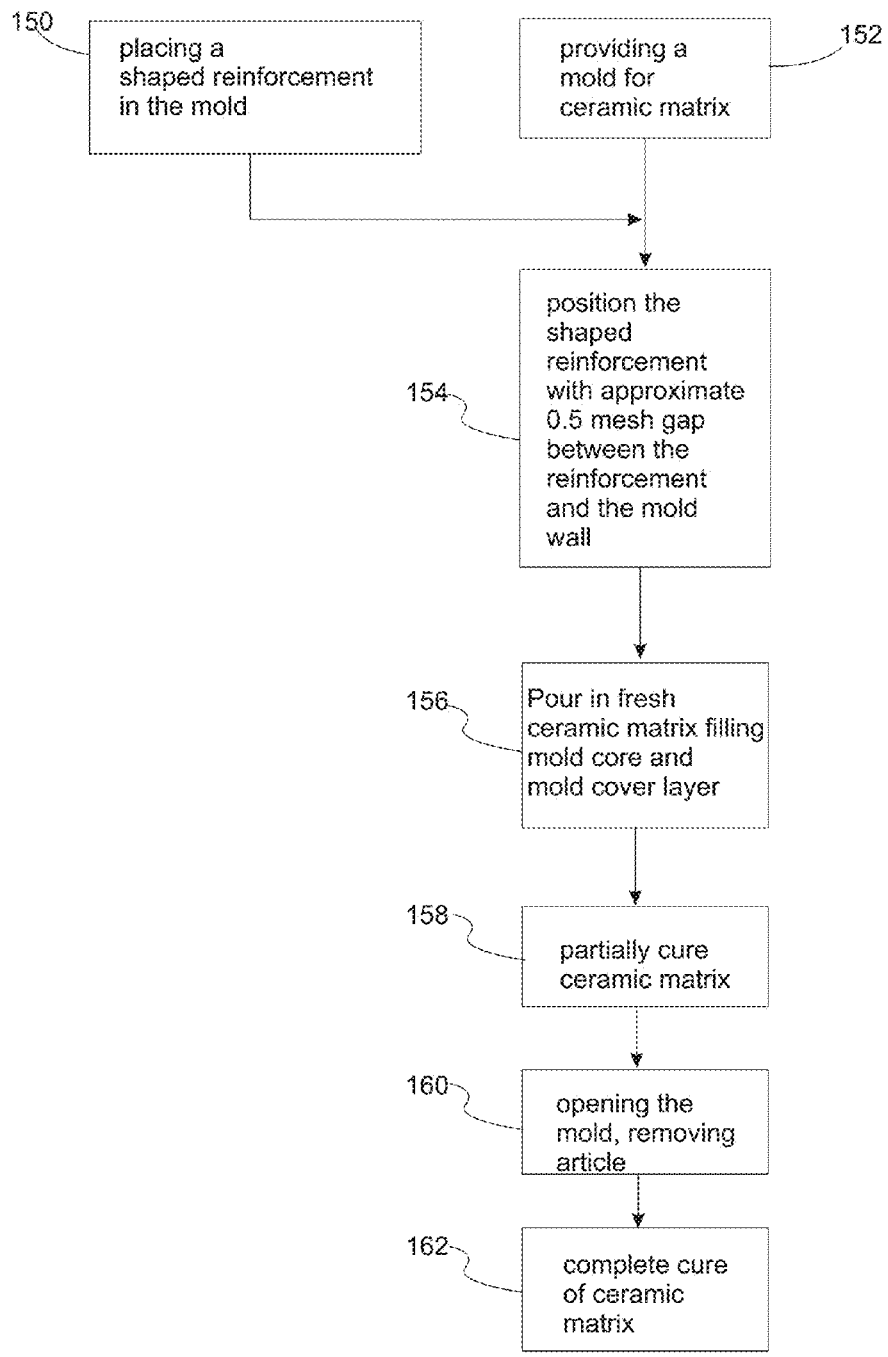
FIG. 11 diagrammatically illustrates a method of manufacture of a self-confining ceramic articles according to at least one embodiment.

FIG. 11 diagrammatically illustrates a method of forming the self-confining structural member. A mold is provided in step 152. The method for forming the self-confining structural member includes placing a shaped reinforcement in step 150 at the center of a mold for a ceramic matrix, such as concrete, defining a core in step 154 by leaving a gap of 0.5 inch within the core between the reinforcement and the wall of the mold in all directions forming a cover layer. In step 156 fresh concrete is poured into the mold to fill up the core and the cover layer The self-confining structural member is water or air cured, or other environments for 30 minutes to seven days in two steps (steps 158 and 162) with a step of opening the mold (step 160) to remove the self-confining structural member between steps 158 and 162. Optionally, the opening the mold step 160 can occur after step 162 in certain embodiments. It is also understood that, in certain variations, the self-confining structural member may be used in the mold with the mold becoming a permanent portion of the structure. In certain refinements, the mold could augment the cover layer thickness, allowing the cover layer to range from 0.05 inches thick to 8 inches thick. In other embodiments, the cover layer ranges from 0.1 inch thick to 4 inches thick. In other variations, the cover layer ranges from 0.5 inch thick to 2 inches thick. In another refinement, the cover layer may range from 0.05% of the self-confining structural member minimum cross-sectional dimension to 30% of the self-confining structural member maximum cross-sectional dimension. In yet another refinement, the cover layer may range from 1% of the self-confining structural member minimum cross-sectional dimension to 20% of the self-confining structural member maximum cross-sectional dimension. In yet another embodiment, the cover layer may range from 5% of the self-confining structural member minimum cross-sectional dimension to 15% of the self-confining structural member maximum cross-sectional dimension.

In at least one embodiment, the cover layer provides a warning by cracking of the ceramic matrix when a structure is overloaded in compressive load. In at least one variation, the cover layer fails catastrophically under compressive load and spalls off, visibly warning even untrained people. But, the self-confining structural member in the overloaded condition does not fail catastrophically at the same time that the spalling episode occurs. It fails progressively, allowing either people to exit the area or potentially to relieve the compressive load, before any or more core failure occurs.

EXAMPLES

Sample 1

A self-confining structural member shaped like a long column having a diameter of 3 inches and a height of 6 inches is formed by the above method with a biconical braided knitted fabric carbon-fiber tube reinforcement.

Sample 2

A long column having the same dimensions as Example 1 is formed by pouring the concrete into the mold, but no reinforcement is present.

Example 1

A standard compressive strength is measured as specified by ASTM C39/C39M, Standard Test Method for Compressive Strength of Cylindrical Concrete Specimens. A compressive load is applied to the top of the columns of samples 1 and 2. The ultimate loading under uniaxial compression of Sample 1 repetitions ranges from 39,000 to 42,000 lbf, while the ultimate loading of Sample 2 is 21,000 lbf. The ratio of improvement with the self-confining structural member to the unreinforced sample 2 ranges from 86% to 100%. In addition, the self-confining structural columns, surprisingly, can be re-loaded after achieving the ultimate compressive load and still achieve substantially the same compressive loading plus or minus 5 relative %.

The self-confining structural columns are classified as malleable under compressive stress, reflecting the plasticity of the self-confining structural column where the solid concrete matrix appears to plastically deform without fracture. The malleability increased in a range of 0.4 to 1.3 inches with sample 1 repetitions relative to 0.05 inches of displacement with the unreinforced sample 2. In all embodiments of self-confining structural columns the mode of failure is observed to be extreme malleable failure.

Figure 12:
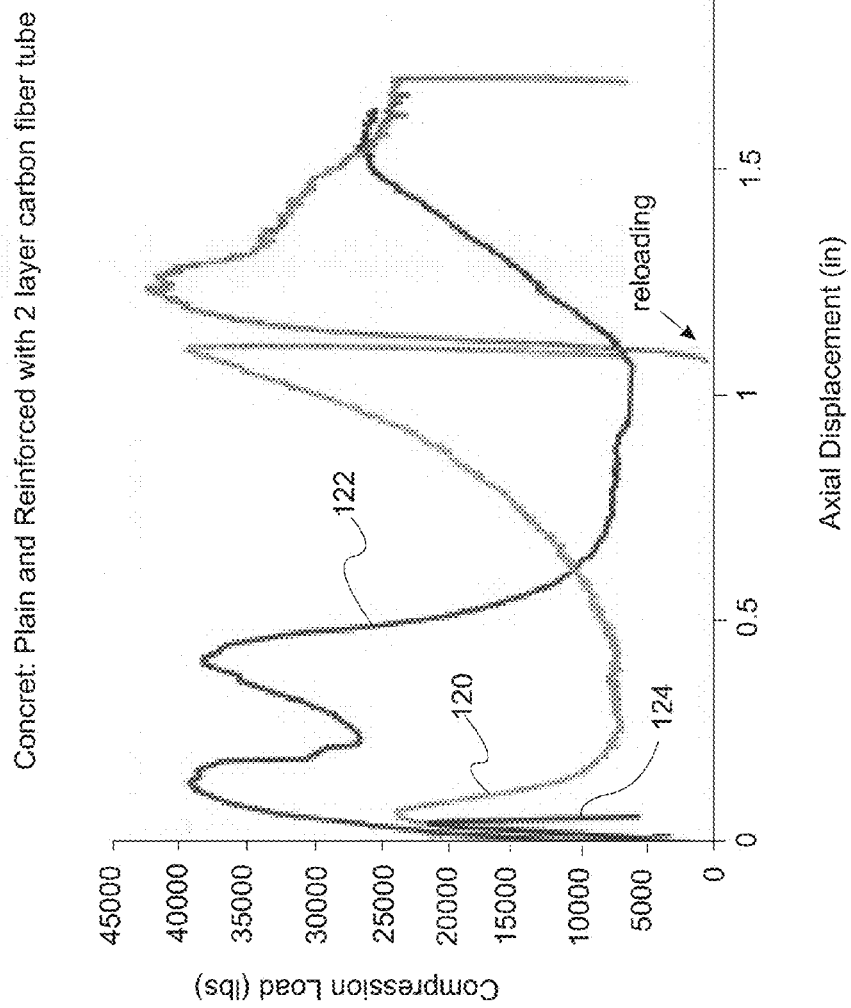
FIG. 12 is a plot of uniaxial compressive load versus displacement for several ceramic columns according to at least one embodiment.

In FIG. 12, the displacement distance in inches versus the compressive load of the samples 1 and 2 are illustrated. Lines 120 and 122 represent repetitions of sample 1. Line 124 represents the unreinforced sample 2.

In general, the range of ultimate strength of sample 1-type self-confining structural columns ranges from 30,000 lbf to 42,000 lbf in at least one embodiment. In another embodiment, the malleability of sample 1-type self-confining structural columns ranges from 0.4 to 2 inches, in at least one embodiment. Surprisingly, this result is on par with steel. Also, surprisingly, the remaining core concrete remains intact and continues to resist more loads as a combined effect result of the reinforcement effect and its confining effect on the core concrete. A final failure mode of the self-confining structural column is progressive axial crushing.

Sample 3

A 12 in long by 1.25 in by 2.5 in high concrete beam is formed using a flat carbon reinforcement in a Portland cement concrete matrix. The reinforcement is placed near the tension surface with the cover layer being 0.125 in thick and facing the tension surface.

Example 2

Figure 13:
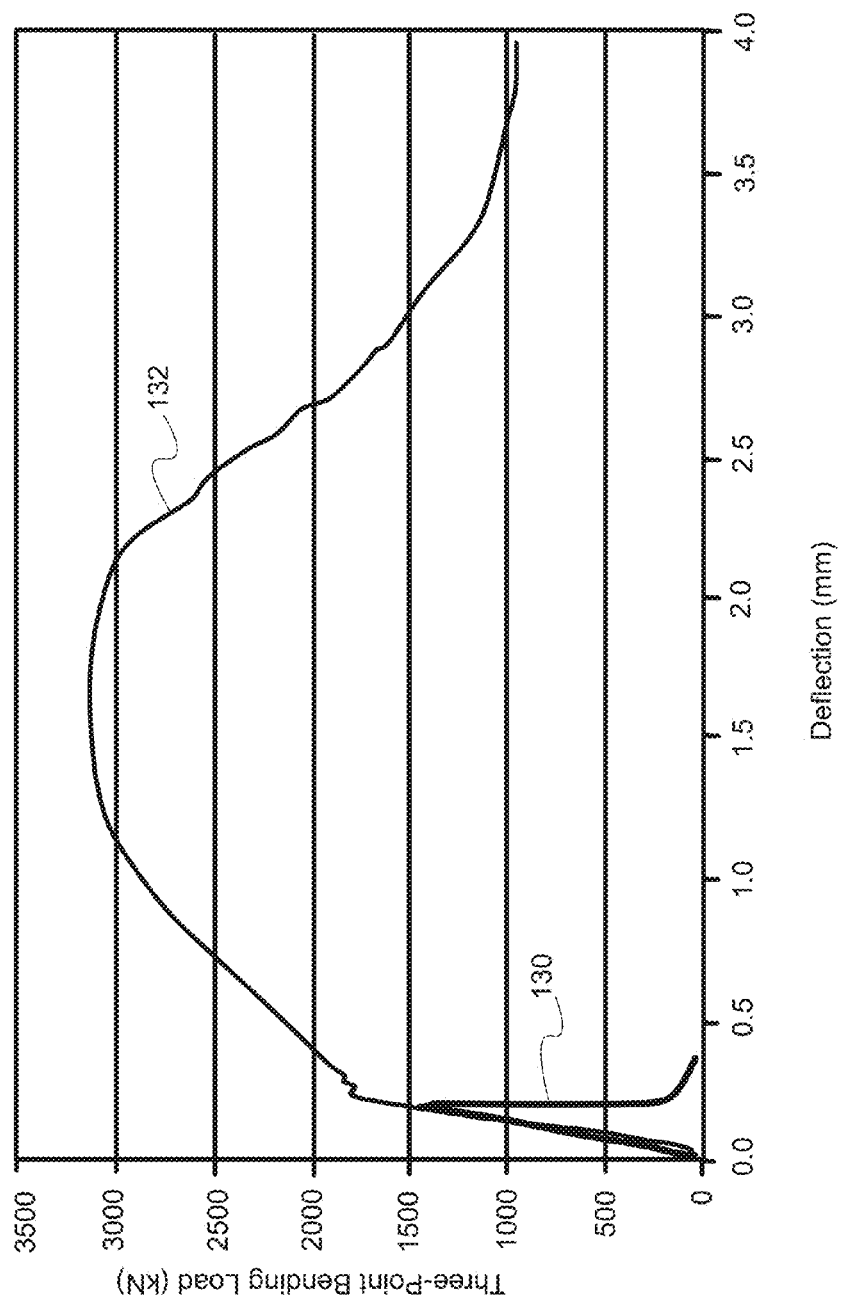
FIG. 13 is a plot of the three-point bending load versus deflection for two ceramic beams according to another embodiment.

The concrete beam is tested under three-point load bending test as specified by ASTM C78/C78M-Standard Test Method for Flexural Strength of concrete (Using Simple Beam with third-Point loading). Analogous to FIG. 13, when the beam was loaded beyond the cracking strength, a flexural crack gradually developed. The flexural crack was held together by the reinforcement. The final failure of the concrete beam was due to progressive rupture of the reinforcement. There is no evidence of delamination between the concrete beam and the reinforcement. In FIG. 13, the deflection versus the three point bending load curve of unreinforced concrete is shown as reference 130. Reference 130 illustrates classic catastrophic failure. Reference 132 illustrates the progressive rupture of the self-confining reinforced concrete beam.

Figure 14:
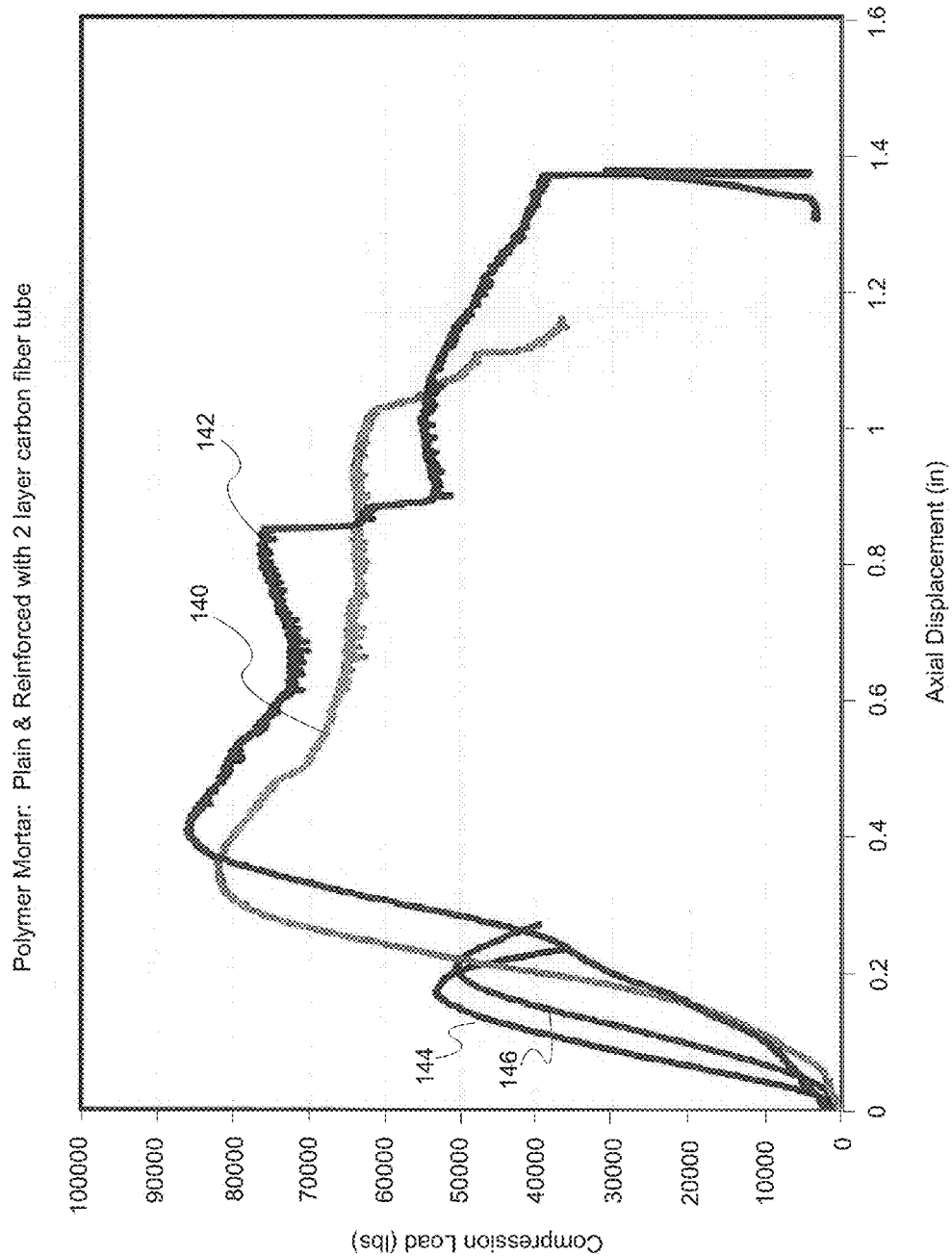
FIG. 14 is a plot of the uniaxial compression load versus displacement for several polymer mortar columns according to at least one refinement.

In FIG. 14, the axial displacement distance in inches versus the compressive load of the samples is illustrated for a polymer mortar matrix. Lines 140 and 142 represent repetitions of tests with polymer matrix and carbon fiber tube reinforcement. Line 144 and 146 represent repetitions of tests of the unreinforced polymer matrix. The polymer matrix exhibits the highest strength, from 80,000 lbs to 84,000 lbs while maintaining ductility.

In at least a first aspect, a self-confining ceramic system comprises a continuous non-corroding reinforcement shaped as a tube, a curved plate, or a plate. The ceramic matrix is disposed about the continuous, non-corroding reinforcement forming an elongated shape having a longitudinal axis, wherein the system includes a non-catastrophic failure mode under compression force, tension or flexure force. The failure mode is a progressive failure mode.

The ceramic matrix is a cement matrix or having aggregate forming a concrete composition with the cement matrix. Alternatively, the cement matrix includes a polymer cement or a magnesium-based cement.

The non-corroding reinforcement is disposed substantially symmetrically about the longitudinal axis. The non-corroding reinforcement is a fabric, or braided fabric, and can include a sizing feature. The non-corroding reinforcement's composition includes at least one of glass fibers, carbon fibers, aramid fibers, oriented polyolefin fibers.

The self-confining ceramic system further comprises a frame having a periphery with opposed and spaced apart sides with a plurality of non-corroding reinforcements, optionally connected to form a pre-form. The preform can have at least one of the plurality of non-corroding reinforcements that is a pre-stressing member.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A self-confining structural article comprising:
a ceramic matrix having an outer surface; and
a reinforcement member disposed within and adjacent to the outer surface of the ceramic matrix, the reinforcement member having a fabric mesh with holes that are less than or equal to 4 mm and a convex side wherein the reinforcement member is a biconical, braided reinforcement member and is encapsulated in a magnesium concrete matrix to form a column having a longitudinal axis about which the biconical, braided reinforcement is concentrically configured.

2. The self-confining structural article of claim 1, wherein the reinforcement member is a cambered tubular shape with a ratio of a center cross sectional area to an end cross sectional area between 0.1 and 1.0.

3. The self-confining structural article of claim 1, further comprising at least one fastener connecting the reinforcement member with at least one additional reinforcement member.

4. The self-confining structural article of claim 1, wherein the reinforcement member contains two types of fibers.

5. The self-confining structural article of claim 1, wherein the reinforcement member includes parallel fibers, fiber bundles, or strands are laid in differing orientations and stitched together in an interlocked reinforcement pattern which transfer force in multiple axes under loading.

6. The self-confining structural article of claim 1, wherein the reinforcement member is non-corroding.

7. The self-confining structural article of claim 1, further comprising a flexible reinforcement member having at least one coating.

8. The self-confining structural article of claim 1, further comprising a frame surrounding the reinforcement member and having a periphery with opposed and spaced apart sides, the reinforcement member connected in at least two places of the frame forming a pre-form.

9. The self-confining structural article of claim 8, wherein the reinforcement member comprises a pre-stressing member.

10. A self-confining structural article comprising:
a ceramic matrix having an outer surface;
a flexible reinforcement member having a fabric mesh with holes that are less than or equal to 4 mm and a convex side, disposed within and adjacent to the outer surface of the ceramic matrix wherein the flexible reinforcement member has a biconical shape that is continuously and smoothly cambered inward from its ends toward a center of the flexible reinforcement member such that the reinforcement member rolls upon itself when a downward force is applied; and
a retainer bracket placed around the flexible reinforcement member with portions of the retainer bracket extending to the outer surface of the ceramic matrix.

11. The self-confining structural article of claim 10, wherein the flexible reinforcement member is a tubular shape with a ratio of a center cross sectional area to an end cross sectional area between 0.1 and 1.0.

12. The self-confining structural article of claim 10, wherein the flexible reinforcement member is a curved sheet.

13. The self-confining structural article of claim 10, wherein the flexible reinforcement member comprises a pre-stressing member.

14. The self-confining structural article of claim 10, further comprising a reinforcement member having at least one coating.

15. The self-confining structural article of claim 10, further comprising a frame surrounding the flexible reinforcement member, having a periphery with opposed and spaced apart sides, having reinforcement members connected in at least two places forming a pre-form.

16. The self-confining structural article of claim 1 wherein the reinforcement member further includes a concave side.

17. The self-confining structural article of claim 1 wherein the reinforcement member further includes a planer side.

18. A self-confining structural article comprising:
a ceramic matrix having an outer surface; and
a reinforcement member disposed within and adjacent to the outer surface of the ceramic matrix, the reinforcement member having a fabric mesh with holes that are less than or equal to 4 mm and a convex side wherein the reinforcement member has a biconical shape that is continuously and smoothly cambered inward from its ends toward a center of the reinforcement member such that the reinforcement member rolls upon itself when a downward force is applied.

19. The self-confining structural article of claim 18, wherein the reinforcement member is a cambered tubular shape with a ratio of a center cross sectional area to an end cross sectional area between 0.1 and 1.0.

20. The self-confining structural article of claim 18, further comprising at least one fastener connecting the reinforcement member with at least one additional reinforcement member.

21. The self-confining structural article of claim 18, wherein the reinforcement member contains two types of fibers.

22. The self-confining structural article of claim 18, wherein the reinforcement member includes parallel fibers, fiber bundles, or strands are laid in differing orientations and stitched together in an interlocked reinforcement pattern which transfer force in multiple axes under loading.

23. The self-confining structural article of claim 18, further comprising a flexible reinforcement member having at least one coating.

24. The self-confining structural article of claim 18, further comprising a frame surrounding the reinforcement member and having a periphery with opposed and spaced apart sides, the reinforcement member connected in at least two places of the frame forming a pre-form.

* * * * *